(12) United States Patent
Bourgard et al.

(10) Patent No.: US 7,722,774 B2
(45) Date of Patent: May 25, 2010

(54) PURE WATER TREATMENT METHOD

(75) Inventors: Fabrice Bourgard, Antibes (FR); Lionel Philippe Bruneau, Paris (FR)

(73) Assignee: Golden Team (FR)

( * ) Notice: Subject to any disclaimer, the term of this patent is extended or adjusted under 35 U.S.C. 154(b) by 234 days.

(21) Appl. No.: 11/596,274

(22) PCT Filed: May 13, 2005

(86) PCT No.: PCT/FR2005/001214

§ 371 (c)(1),
(2), (4) Date: Sep. 25, 2007

(87) PCT Pub. No.: WO2005/115925

PCT Pub. Date: Dec. 8, 2005

(65) Prior Publication Data

US 2008/0264874 A1    Oct. 30, 2008

(30) Foreign Application Priority Data

May 13, 2004    (FR)    .................................... 04 05248

(51) Int. Cl.
*C02F 1/36* (2006.01)

(52) U.S. Cl. .................. 210/748.02; 210/767; 210/766; 210/764

(58) Field of Classification Search ................. 210/748, 210/748.01, 748.11, 766, 767, 764
See application file for complete search history.

(56) References Cited

U.S. PATENT DOCUMENTS

| | | |
|---|---|---|
| 6,521,248 B1 | 2/2003 | Holloway et al. |
| 2003/0164308 A1 | 9/2003 | Schlager et al. |
| 2003/0173307 A1 | 9/2003 | Carlson et al. |

FOREIGN PATENT DOCUMENTS

| | | |
|---|---|---|
| FR | 2 121 983 | 8/1972 |
| WO | WO 83/02606 | 8/1983 |
| WO | WO 02/060821 | 8/2002 |

*Primary Examiner*—Walter D Griffin
*Assistant Examiner*—Cameron J Allen
(74) *Attorney, Agent, or Firm*—Cantor Colburn LLP

(57) ABSTRACT

The invention relates to a pure water treatment method. According to the invention, once ultra-pure water has been obtained, it is treated by means of cavitation in a tank that is equipped with an acoustic antenna (3) comprising Tonpilz-type piezoelectric transducers which emit at least at the excitation frequency of the water molecules with a sound power that enables the cavitation threshold to be exceeded, taking account of the quantity of water to be treated.

9 Claims, 2 Drawing Sheets

PURE WATER TREATMENT METHOD

BACKGROUND OF THE INVENTION

Water is the most important chemical compound on the planet: 70% of the Earth's surface corresponds to the seas and oceans. The human body contains 65% of its weight as water and the Earth's atmosphere contains 0.001% water. In the human body, the blood contains 85%, the intestinal juice 99.3%, the gastric juices 99.4% and saliva 99.5% water, hence the importance of water in biological processes. An essential component of life on Earth, water is the preeminent solvent in industrial and biological chemistry. It should be pointed out that if in industry the purity of the water is essential, it is even more so in biology. Despite all research, the water molecule remains strange and poorly understood. There are in fact several types of water molecule, which means that water is a mixture of chemical compounds. The predominant molecule is $H_2O$, but because of the isotopes of hydrogen and oxygen, there are correspondingly 18 kinds of water molecule. More particularly, there are small quantities of heavy water or $D_2O$, which is a neutron moderator, whereas $H_2O$ is a neutron capture agent. Tritiated water, $T_2O$, which is radioactive, is found in rainwater in very small quantities. With $D_2O$ biological reaction rates are lower and the physical constants are slightly different (the density of $D_2O$ is greater than 1).

In the Periodic Table of the Elements, oxygen is element No. 8 and is found on the second row of column VI. Corresponding to each element of the family in column VI is a hydrogenated compound:

| | |
|---|---|
| O (oxygen) | $H_2O$ |
| S (sulfur) | $H_2S$ |
| Se (selenium) | $H_2Se$ |
| Te (tellurin) | $H_2Te$ |

In general, the physical and chemical properties of the elements of any one column are similar or change in a regular fashion. In the case of water, certain constants are unexpected: high values are found for the melting point, the boiling point, the latent heat of vaporization ($H_v$), the heat of melting ($H_m$) and the specific heat ($C_m$), and water has a maximum density at C and a high dielectric constant ($\in_r$). These anomalies stem from the existence of particular bonds between water molecules in the solid state, in the liquid state and even the gaseous state (the number of anomalies is 38).

More particularly, the melting point and boiling point are abnormal for water compared with the family of hydrogenated compounds of the elements of the family in column VI.

| | $H_2S$ | $H_2Se$ | $H_2Te$ | $H_2O$ | |
|---|---|---|---|---|---|
| $T_m$ | −51° C. | −60° C. | −85.6° C. | 0° C. | Instead of −100° C. |
| $T_b$ | −2° C. | −41.5° C. | −60.7° C. | +100° C. | Instead of −80° C. |

Moreover, in the case of the other liquids the density decreases linearly as the temperature increases, which is not true for water, except for at high temperature. The maximum density is observed at 4° C. at 1 atmosphere, here again because of its peculiar structure.

According to Dr. Lorenzen, an expert in biology, the water contained in sugared beverages, beer, etc. is not, or little, used by cells and is expelled directly via the kidneys.

Depending on the intracellular or extracellular medium, water adopts different configurations.

Each type of cell uses four principal types of configuration of water for its operation.

Water molecules grouped together in clusters or microclusters allow information transfer between cells: proteins of the information system are surrounded by nine rings consisting of microclusters. Therefore information can flow only if the water has a very particular structure—this structure is modified by temperature and the solutes that it contains.

It seems that the trimer $(H_2O)_3$ plays a predominant role in cell metabolism.

Water allows both assimilation during cell metabolism and waste transport, hence the need for pure water with a very low mineral content in order not to overload the electrolyte environment of the cell and modify the osmotic pressure therein.

In blood serum there are 80 g of proteins per liter and the viscosity is increased by a factor of two, while the presence of NaCl in the physiological saline does not modify this viscosity. Likewise, increasing the number of red blood cells in the blood increases its viscosity.

It therefore seems necessary that supply water be of the lowest possible mineral content so that it can fully play its bonded liquid role in exchanges with the cell.

The benefit of water with a low mineral content is that it can be much better assimilated by the cell and avoids overworking the kidneys to remove the minerals. This is because plants pre-assimilate the trace elements that the organism is incapable of assimilating directly (man and animals are heterotrophic, while plants are autotrophic).

Professor Schroder, a world authority on the subject of water, contests the recommendation for mineral-laden water for supply.

Moreover, although perfectly pure water has a pH of 7 at 25° C. and is very sensitive to external attack by acids or bases, mineral-laden water that contains hydrogenocarbonate ions is less sensitive, owing to a buffer effect.

The presence of calcium ions ($Ca^{2+}$) and magnesium ions ($Mg^{2+}$) gives the water a certain hardness characterized by its total hardness (TH). In the case of water for beverages, legislation imposes a total hardness such that: 15<TH>25, whereas perfectly assimilable water must have a total hardness TH.

From the same source, to use softeners is not recommended since replacing calcium and magnesium ions with sodium ions is not beneficial to health.

Water that contains silica and has also been demineralized may have a slightly acid pH.

Water and extracellular and intracellular exchanges:

In order for cell life to be maintained, many diverse substances must continually cross the plasma membrane. Sugars, amino acids and other nutrients must enter the cell so as to meet its energy requirements and sustain its growth; waste and other degradation products must be removed therefrom, as they are toxic for the cell. Ions must be transported in both directions, so as to maintain the ionic composition of the intracellular medium, which is very different from the surrounding medium—it is much richer in potassium ions and less rich in sodium ions. These inequalities lead to leaks (due to osmotic principles) which must be compensated for by transport, in the reverse direction, against the concentration gradient. All this entails intense two-way traffic across the plasma membrane (a continuous phospholipid double layer) involving diffusion phenomena (simple or facilitated diffusion) and active transport. Only water is capable of allowing this transport.

These notions show that the plasma membrane is an important structure for maintaining the concentrations of ions and molecules in the cell and for its biochemical isolation with respect to the outside or to other cells.

These exchanges across the cell membrane show the importance of water.

SUMMARY OF THE INVENTION

The technical problem at the basis of the invention is how to produce water with a smallest existing polymeric form (dimer, trimer and pentamer) and with the lowest mineral content. These criteria promote exchanges at cell level and more particularly make it easier for water polymers to pass through the plasma membrane.

The solution provided by the present invention is to depolymerize the water in dimer, trimer and pentamer form to the largest extent relative to the volume of water treated.

DESCRIPTION OF THE PRIOR ART

Methods of water potabilization or cleansing using ultrasonic cavitation for producing agitation and stirring, resulting, in the presence of oxidizing chemical reactants, in the water being sterilized by bactericidal action, are known.

Also known is the production of "microcluster" liquids, and especially oxygenated "microcluster" water, by means of a method using cavitation.

Such a method is described for example in the U.S. Pat. No. 6,521,248 published on 18 Feb. 2003. This patent describes a method in which the cavitation is obtained by pressurization, by turbulent flow, creating bubbles, followed by rapid depressurization, causing the bubbles to implode or explode. The shock waves thus generated break up the polymeric chains.

This process is repeated until the water reaches a temperature of around 60° C.

The pressurization is obtained by means of pumps, and pressure cycles must be repeated in order to heat the water. These two aspects obviously make the method ill-suited to achieving large throughputs.

To alleviate this drawback, the invention proposes a method for the microclusterization of water, the water being pretreated so as to be ultrapure, chiefly characterized in that the ultrapure water is preferably heated until tepid, and in that the tepid water is microclustered by ultrasonic cavitation obtained by means of an acoustic antenna that includes at least one transducer emitting at a frequency equal to the excitation frequency of the water molecules or higher, with an acoustic power sufficient to exceed the cavitation threshold, taking into account the quantity of water treated.

BRIEF DESCRIPTION OF THE DRAWINGS

Further features and advantages of the invention will become clearly apparent in the following description, which is given by way of non-limiting example and with regard to the appended figures which show:

FIG. 4, a diagram of the side view of the treatment tank according to the invention turned through.

DESCRIPTION OF THE PREFERRED EMBODIMENT

Figure 1:
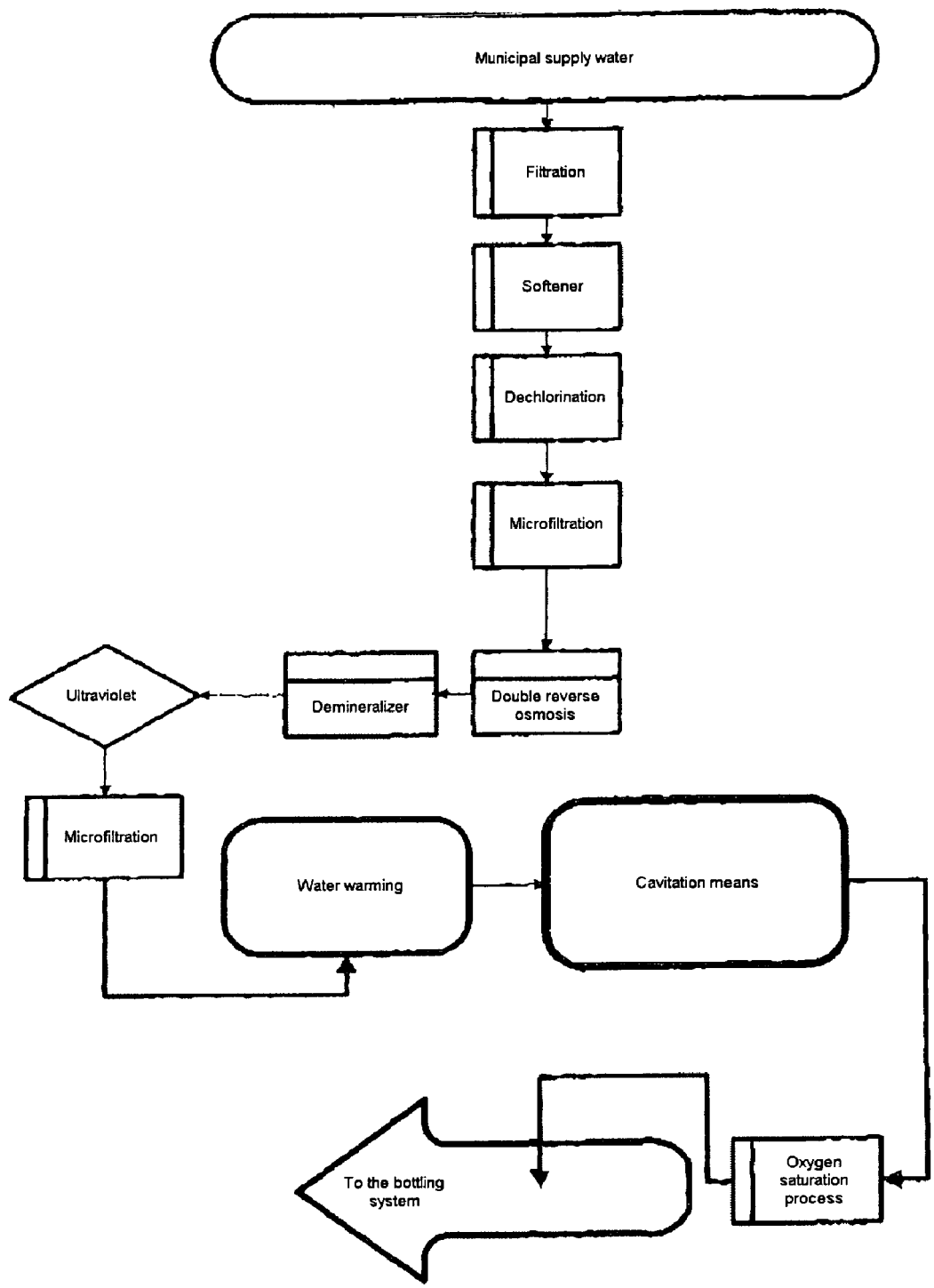
FIG. 1, a complete water purification method.

Before the actual microclusterizing step, which is the subject of the invention, the method, according to a preferred embodiment, comprises several treatment steps shown in the form of a block diagram in FIG. 1.

As is known, the following steps are carried out:
filtration by a filter with a pore size of less than 10 microns;
softening, by removal of the calcium, magnesium and carbonate ions;
dechlorination;
microfiltration using a filter with a pore size of less than 1 micron;
reverse osmosis via a semipermeable membrane, which separates the dissolved solids, the organic matter, viruses and bacteria from the water;
demineralization;
disinfection and removal of contaminants from the water by ultraviolet radiation; and
definitive microfiltration.

The water thus obtained is sent into a tank 1 so as to undergo the following two treatments therein:
warming, to make the water tepid—without departing from the scope of the invention the warming may be performed upstream; and
microclusterization, by ultrasonic cavitation according to the method of the invention.

Figure 3:
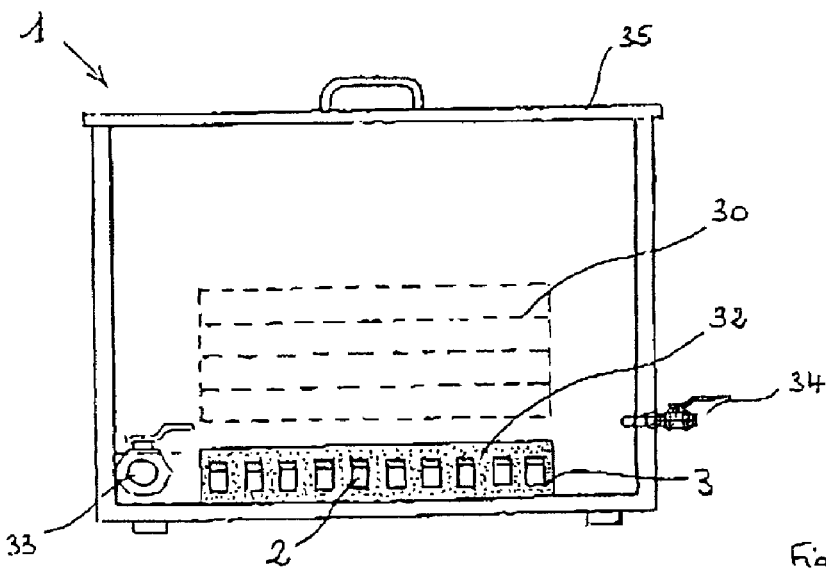
FIG. 3, a diagram in side view of the treatment tank according to the invention.
Figure 4:
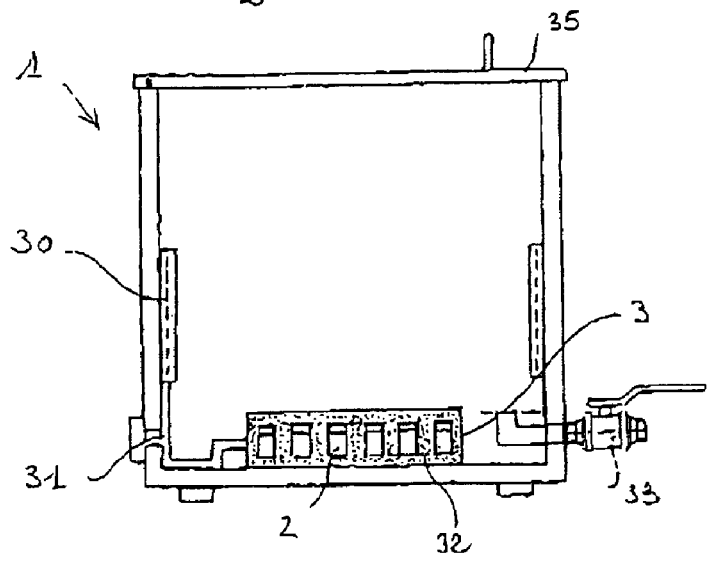

Referring to FIGS. 3 and 4, the water is warmed to a temperature between 40° C. and 60° C., preferably 55° C., in a known manner by means of the electrical resistance elements 30 placed on the walls of the tank. Of course, according to the invention, several piezoelectric transducers (2) are placed on the bottom of the tank so as to sonicate the entire volume of water that it contains with a uniform pressure field and at a frequency corresponding to at least the excitation frequency of the water molecules, making it possible to achieve the desired percentage content of clusters (dimers, trimers and pentamers).

Figure 2:
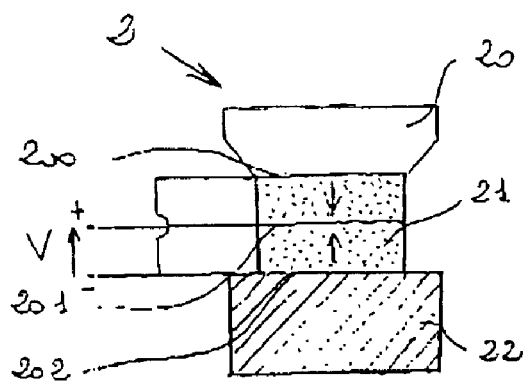
FIG. 2, a longitudinal sectional diagram of a transducer used.

To do this, according to a preferred embodiment, Tonpilz transducers, such as those used in submarine acoustic applications, and shown in FIG. 2, are employed.

Briefly, these consist of a horn 20, a motor 21 formed from a stack of biased piezoelectric ceramic plates and a counterweight 22.

The ceramic plates are provided with electrodes 200, 201, 202 so as to apply an AC voltage V, thus generating an alternating acoustic pressure wave. The transducer behaves as a spring/mass system of mass M and spring constant K, and resonance is obtained for a frequency equal to $$\frac{1}{2\pi}\sqrt{\frac{K}{M}}$$

corresponding to the maximum power emitted. The frequency of the AC voltage applied to the transducer is therefore advantageously chosen to be equal to or close to the resonant frequency.

The size (diameter at the side) of the horn must be of the order of $\lambda/2$, where $\lambda$ is the wavelength in water corresponding to the emitted frequency, so that the transducer has an approximately hemispherical elementary directivity.

The set of transducers placed side by side thus forms a flat antenna 3.

To obtain a uniform pressure field, the transducers are excited in parallel and placed uniformly apart, separated by a distance between λ and 1.5λ, occupying the major portion of the tank bottom.

The number of transducers depends on the acoustic power delivered by each transducer and on the quantity of water treated, knowing that on average it requires about 10 acoustic watts per liter of water to exceed the cavitation threshold.

Exemplary Embodiment

Experiments have shown that, to obtain the desired percentage content of microclusters, the emitted frequency must be between 15 kHz and 35 kHz approximately.

A tank capable of treating 100 liters of water with a frequency of 25 kHz using an emission antenna formed from sixty transducers, each supplied with electric power of about 30 watts was produced.

The antenna 3 consisted of a rectangular parallelepiped measuring 600 mm×360 mm×100 mm, forming a box in which the transducers were positioned, electrical power 31 being supplied on one side. The transducers were embedded in polyurethane 32, which damped the parasitic vibrations emitted by the transducers outside the horn.

The water inlet and outlet were made by means of two valves 33, 34 located toward the bottom of the tank. The latter included a pivoting lid 35 in order to be able to gain access thereto.

The microcluster water was then saturated with pure oxygen at the tank outlet in order to prevent it from being contaminated by other gases (FIG. 1).

The invention claimed is:

1. A method for treating pure water, the method comprising,
   pre-treating water in manner that removes mineral compounds and suspended particles
   subjecting the water to ultrasonic cavitation obtained by means of an acoustic antenna that includes at least one transducer emitting at a frequency equal to an excitation frequency of the water molecules or higher, with an acoustic power sufficient to exceed a cavitation threshold, taking into account a quantity of water treated, wherein the excitation frequency is between 15 and 35 kHz, and wherein power delivered to produce the ultrasonic cavitation is of the order of 10 acoustic watts per liter of water; and
   pre-heating the water to a temperature between 40° C. and 60° C. prior to the ultrasonic cavitation.

2. The method as claimed in claim 1, wherein transducers are Tonpilz piezoelectric transducers.

3. The method as claimed in claim 2, wherein the acoustic antenna is a flat antenna and the transducers are positioned at regular intervals, the distance between the transducers being between λ and 1.5λ, λ being the wavelength corresponding to the emitted frequency.

4. The method as claimed in claim 1, wherein the pre-heating includes pre-heating the water to a temperature of 55° C.

5. The method as claimed in claim 1, wherein the wherein the excitation frequency is 25 kHz.

6. The method as claimed in claim 3, wherein a diameter side size of a horn is λ/2.

7. The method as claimed in claim 2, wherein the transducers are embedded in polyurethane.

8. The method as claimed in claim 1, wherein the treatment is carried out inside a tank, the antenna being place on a bottom of the tank.

9. The method as claimed in claim 1, wherein the transducers are electrically supplied in parallel.

* * * * *